(No Model.)
J. C. MILLER & A. H. JONES.
DRAWER PULL.
No. 288,837. Patented Nov. 20, 1883.
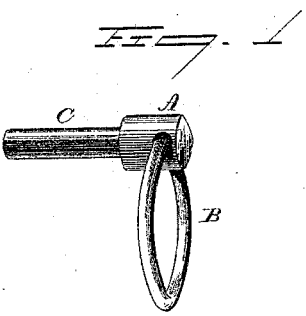
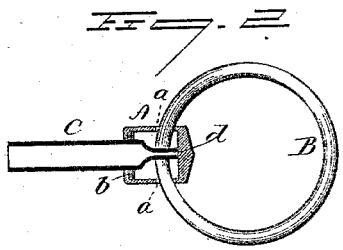
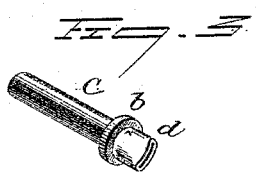
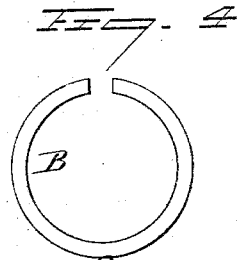

UNITED STATES PATENT OFFICE.

JOHN C. MILLER AND AUGUSTUS H. JONES, OF MERIDEN, CONNECTICUT, ASSIGNORS TO THE FOSTER HARDWARE COMPANY, OF SAME PLACE.

DRAWER-PULL.

SPECIFICATION forming part of Letters Patent No. 288,837, dated November 20, 1883.

Application filed September 3, 1883. (No model.)

To all whom it may concern:

Be it known that we, JOHN C. MILLER and AUGUSTUS H. JONES, of Meriden, in the county of New Haven and State of Connecticut, have invented a new Improvement in Drawer-Pulls; and we do hereby declare the following, when taken in connection with accompanying drawings and the letters of reference marked thereon, to be a full, clear, and exact description of the same, and which said drawings constitute part of this specification, and represent, in—

Figure 1, a perspective view; Fig. 2, a horizontal section through the socket; Fig. 3, a perspective view of the shank detached; Fig. 4, the ring detached.

This invention relates to an improvement in that class of drawer-pulls in which a socket is secured to the drawer-front, and in that socket a ring introduced to serve as the pull, and which is hung so as to drop into a vertical plane when not required for use. Various constructions have been devised to make this socket-connection with the drawer-front in a cheap and durable manner. Many of such constructions are complicated and weak, quickly get out of order, or permit the disengagement of the ring.

The object of our invention is to construct the socket so that the ring may have a strong hold, swing freely, not liable to get out of repair, and yet of the cheapest possible construction; and it consists in a hollow socket having an opening at each side, through which the divided ring may be introduced, combined with a shank arranged concentric within the cylinder, projecting therefrom to enter the drawer-front, the end of the shank within the socket flattened so as to stand in the division of the ring and prevent its turning, the shank and socket secured together, and as more fully hereinafter described.

A represents the socket, which is cup-shaped. At diametrically-opposite points an opening, $a$, is made through the side of the socket to receive the ring B. The ring B is divided, as seen in Fig. 4.

C is the shank, made of metal tubing, and is constructed with a collar, $b$, near the socket end, the collar corresponding substantially to the internal diameter of the socket. At the socket end the tube is flattened, as at $d$. The depth of the socket is a little greater than the distance from the flattened end of the shank to the collar.

The ends of the ring B are introduced into the holes in the sides of the socket and brought nearly together. Then the shank is introduced, bringing the flattened end $d$ between the two ends of the ring, as seen in Fig. 2. This brings the collar $b$ within the open end of the socket, and so that the open end of the socket, turned down over the collar, as seen in Fig. 2, closes the socket upon the collar, and thereby secures the socket to the shank. The end of the shank bears hard against the closed end of the socket, as seen in Fig. 2.

The shank may be internally or externally threaded, the internal threading being the more general construction, and so as to receive a screw introduced from the inner side of the drawer-front.

The collar $b$ on the shank may be made by upsetting the metal; or it may be a ring made fast to the shank. If the shank be externally threaded, so as to receive the nut upon the inside of the drawer, then it may be solid; but we prefer to make the shank tubular and thread it upon the inside or outside, as may be desired.

We claim—

In a drawer-pull, the combination of the cup-shaped socket A, the divided ring B, the shank constructed with the collar $b$, its end flattened to stand in the socket between the two ends of the ring, and the socket closed upon the collar, substantially as described.

JOHN C. MILLER.
AUGUSTUS H. JONES.

Witnesses:
E. A. MERRIMAN,
J. F. ALLEN,
J. T. WALKER.